United States Patent
Bout et al.

(10) Patent No.: US 12,496,858 B2
(45) Date of Patent: Dec. 16, 2025

(54) DEVICE FOR AN ELECTRONIC SYSTEM FOR CHECKING THE PRESSURE OF THE TYRES OF A MOTOR VEHICLE

(71) Applicant: ATEQ, Les Clayes sous Bois (FR)

(72) Inventors: Michel Bout, Shanghai (CN); Vincent Moreau, Les-Clayes-sous-Bois (FR)

(73) Assignee: ATEQ, Les Clayes sous Bois (FR)

( * ) Notice: Subject to any disclaimer, the term of this patent is extended or adjusted under 35 U.S.C. 154(b) by 801 days.

(21) Appl. No.: 17/602,127

(22) PCT Filed: Mar. 11, 2020

(86) PCT No.: PCT/EP2020/056429
§ 371 (c)(1),
(2) Date: Oct. 7, 2021

(87) PCT Pub. No.: WO2020/207688
PCT Pub. Date: Oct. 15, 2020

(65) Prior Publication Data
US 2022/0144024 A1    May 12, 2022

(30) Foreign Application Priority Data

Apr. 9, 2019 (FR) ..................................... 1903789

(51) Int. Cl.
*B60C 23/04* (2006.01)
*G07C 5/00* (2006.01)
*G07C 5/08* (2006.01)

(52) U.S. Cl.
CPC .......... *B60C 23/0479* (2013.01); *G07C 5/008* (2013.01); *G07C 5/0808* (2013.01); *G07C 5/0825* (2013.01); *G07C 2205/02* (2013.01)

(58) Field of Classification Search
CPC .. B60C 23/0479; G07C 5/008; G07C 5/0808; G07C 5/0825; G07C 2205/02
See application file for complete search history.

(56) References Cited

U.S. PATENT DOCUMENTS 5,041,817 A * 8/1991 Reeb .................... G01R 31/00
340/646
6,438,193 B1 * 8/2002 Ko ........................ B60T 8/1725
377/16
(Continued)

FOREIGN PATENT DOCUMENTS

EP    2732988 A1    5/2014
GB    2264360 A     8/1993
(Continued)

OTHER PUBLICATIONS

Chuncheng Shi, The Essence of Open Questions in Middle School Physics, p. 132, Sep. 2003, Scientific and Technical Documentation Press, Beijing China.

*Primary Examiner* — Frederick M Brushaber
(74) *Attorney, Agent, or Firm* — Young Basile Hanlon & MacFarlane, P.C.

(57) ABSTRACT

Described herein are devices for an electronic system for checking the pressure of the tyres of a motor vehicle, said device comprising at least one means for activating tyre sensors, a means for receiving signals from the sensors, an electronic unit configured to store and/or process information conveyed by the signals emitted by said sensors, and a means for communicating with an on-board computer of the motor vehicle with a view to transmitting the information from at least one of said sensors.

20 Claims, 4 Drawing Sheets

(56) References Cited

U.S. PATENT DOCUMENTS

| | | | | |
|---|---|---|---|---|
| 8,736,435 B2* | 5/2014 | Kanenari | ............ | B60C 23/0472 |
| | | | | 73/146 |
| 8,912,896 B1* | 12/2014 | Yu | ................ | B60C 23/0479 |
| | | | | 340/447 |
| 9,122,423 B2* | 9/2015 | McIntyre | ................ | G06F 8/65 |
| 9,384,602 B2* | 7/2016 | Chu | ................ | G07C 5/0825 |
| 9,487,054 B2* | 11/2016 | McIntyre | ............ | B60C 23/0471 |
| 9,731,564 B2* | 8/2017 | Lehmann | ............ | B60C 23/0479 |
| 2013/0106596 A1* | 5/2013 | Mouchet | ............ | B60C 23/0472 |
| | | | | 340/445 |

FOREIGN PATENT DOCUMENTS

| | | | |
|---|---|---|---|
| GB | 2500697 | A | 10/2013 |
| WO | 2013063061 | A1 | 5/2013 |

\* cited by examiner

DEVICE FOR AN ELECTRONIC SYSTEM FOR CHECKING THE PRESSURE OF THE TYRES OF A MOTOR VEHICLE

CROSS-REFERENCE TO RELATED APPLICATION(S)

This application is filed under 35 USC 371 and claims priority benefit to PCT patent application PCT/EP2020/056429, which claims priority to and the benefit of French patent application no. 1903789, which was filed on Apr. 9, 2019, the entire disclosure of both applications are hereby incorporated by reference.

TECHNICAL FIELD

This disclosure relates to relates to the field of electronic tyre pressure checking systems, the usual abbreviation for which is "TPMS".

Some implementations relate more particularly to a device for communicating with and reprogramming one or more elements of the electronic tyre pressure checking systems (a device sometimes also referred to as a TPMS valve forcer).

BACKGROUND

Generally, an electronic tyre pressure checking system comprises an onboard computer housed in the vehicle, as well as one or more pressure sensors disposed inside the tyres, and therefore measuring the internal pressure of the tyre, and configured to communicate this pressure value to the onboard computer of the vehicle.

The onboard computer can thus alert the user of the vehicle if one of the tyres were to burst or deflate, causing a risk to their safety.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
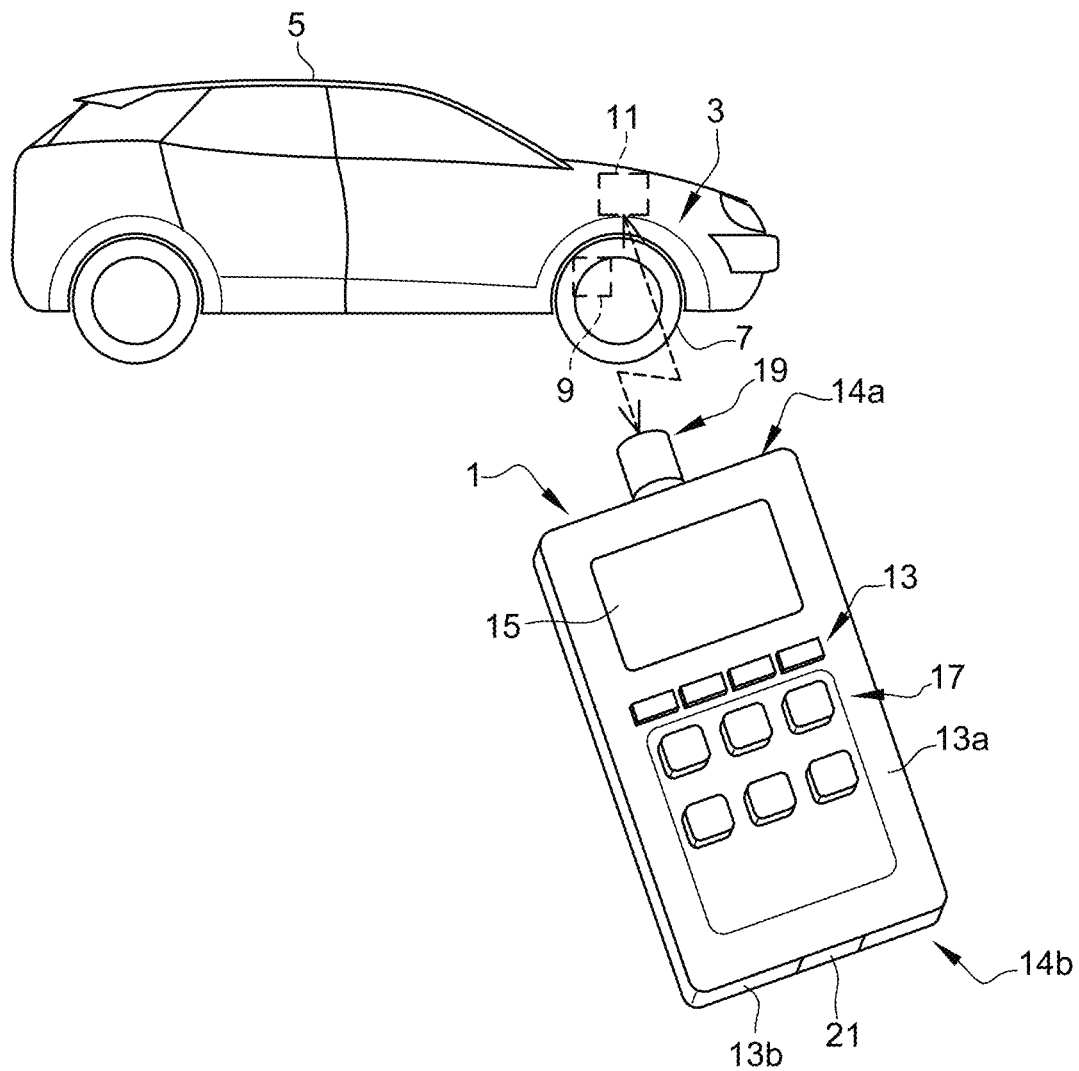
FIG. 1 is a highly schematic representation in perspective of a device according to the invention cooperating with an electronic tyre pressure checking system of a motor vehicle.

Ordinarily, the pressure sensor housed in the wheel is not removable. Thus, changing a wheel involves changing the sensor, the new sensor then not being automatically detected by the onboard computer of the vehicle.

It may therefore be helpful, when changing tyres, to match (or associate) the sensors housed in the new tyres with the onboard computer of the vehicle. This matching is done by means of the device, said device being configured to activate the sensors, to recover and record the relevant data emitted by the sensor (such as the identifier of the sensor) and to transmit them to the onboard computer, so that the latter detects the sensors housed in the newly installed tyres and can capture the signals therefrom and communicate them to the user in order to warn them in the event of a pressure drop in one of said tyres.

In some implementations, a device for an electronic tyre pressure checking system of a motor vehicle is described, said device comprising:

means for activating tyre sensors,
means for receiving signals coming from the sensors,
an electronic entity configured for storing and/or processing information conveyed by the signals emitted by said sensors, means for communicating with an onboard computer of a motor vehicle for transmitting the information from at least one of said sensors.

According to one possible feature, the device cooperates with pressure sensors, but it could cooperate with sensors of other types, such as temperature, humidity, etc. sensors housed in a tyre and which it is necessary to match with the onboard computer of the vehicle when changing a tyre.

According to another possible feature, said at least one means for activating sensors comprises an antenna. It should be noted that the antenna can be assimilated to an LC resonant circuit (the power of the signal emitted by the LC circuit depends in particular on the quantity of energy injected, this being in particular controlled by the variable supply voltage and/or by modulation of the pulse width of said voltage).

Said antenna is configured for emitting an activation signal on a frequency adapted to said sensors, such as a frequency of 125 kHz.

According to another possible feature, said activation means comprises an electrical conversion system, said system being configured for converting a first voltage VB into a second voltage VLF.

The second voltage VLF may be used directly or indirectly for generating a sensor activation signal. It should be noted that indirectly means the fact that the second voltage may undergo additional transformations/modifications before being used for generating said activation signal. The characteristics of the activation signal generated by said at least one activation means are correlated with the characteristics of the voltage used for generating said signal.

According to another possible feature, said electrical conversion system is configured for delivering two distinct (or different) values VLF1 and VLF2 of said second voltage VLF.

It has been found that the power of the activation signal emitted by the sensor activation means is substantially proportional to the squared value of the voltage used for generating said activation signal. Moreover, the various models of sensors may have a variable sensitivity to the activation signals. It is therefore advantageous to be able to vary the power of the activation signal in order not to unintentionally activate a plurality of sensors in the vicinity and to falsify the matching between the required sensor and the onboard computer of the vehicle. And conversely, some sensors being not very sensitive, it is then advantageous to have signals having a sufficiently high power to activate them. Thus, the first voltage value VLF1 corresponds for example to the minimum voltage for activating at least one type of sensor and the second voltage value VLF2 corresponds to the voltage for activating the majority of existing sensors (and in addition adapting the voltage makes it possible to adapt the signal quality and to adapt to the sensitivity of the sensor).

According to another possible feature, the activation means comprises (e.g., characterized by) a circuit, such as a PWM module (PWM standing for "pulse width modulation") making it possible to vary the amplitude of the signal arriving at the antenna, said signal serving to generate the signal (for example sinusoidal) activating the sensors.

According to another possible feature, said conversion system comprises a module that is supplied by the first voltage VB and is associated with at least one switch, said module delivering a first voltage value VLF1 if the switch is open and a second voltage value VLF2 is the switch is closed.

Said switch is for example a transistor, such as a field effect transistor.

According to another possible feature, the switch is controlled by the electronic entity of said device.

According to another possible feature, said module comprises a voltage-increase circuit or component, as well as a voltage divider bridge.

According to another possible feature, said communication means is an OBD module that is housed in said device and is configured to be connected to the onboard computer.

According to another possible feature, the device comprises a display device, such as an LCD or TFT screen.

Said display device makes it possible for example to display the data received by means of the signals emitted by sensors housed in the various tyres.

According to another possible feature, said communication means comprises an OBD socket.

The OBD socket is configured to allow the connection of an OBD cable and to connect thus by wire to the onboard computer of a vehicle.

It should be noted that OBD means all the OBD modules complying with standards OBD, OBD-II, E-OBD, J-OBD, etc.

According to another possible feature, the device comprises )e.g., characterized by) a housing in which the display device and the OBD socket are housed, the OBD socket and the display device being disposed at opposite ends of said housing.

It is in fact advantageous on an ergonomic level to dispose the OBD socket and the display device as far as possible from each other.

Said housing, for example made from plastics material, comprises two opposite main faces connected together by four secondary faces opposite in pairs. In addition, said housing has an elongate shape and thus includes two opposite longitudinal ends. The display device is preferentially disposed on one of the main faces in proximity to one of the longitudinal ends, while the OBD socket is disposed on the other one of the secondary faces in proximity to or on the other longitudinal end.

According to another possible feature, the device comprises a battery and a communication port, said communication port being configured to be connected to an electrical supply source in order to recharge said battery.

Said communication port is for example a port of the USB type. It should be noted moreover that the electrical supply source may be a mains socket, but also any type of electronic or electrical apparatus capable of electrically supplying the battery, such as a computer.

It is advantageous to be able to recharge the battery of said device by a communication port, since this avoid installing a specific connection for this and excessively increasing the manufacturing cost of said device.

According to another possible feature, the electronic entity is configured to detect the type of electrical supply source that is connected to said device by means of the communication port.

According to another possible feature, the electronic entity detects the type of electrical source by means of a message sent by an electronic apparatus and/or by the absence of a message.

In fact, said electronic entity detects the type of electrical supply source by receiving a message (or signal) through said communication port (a message generally encoded by variations in the voltage and/or the intensity delivered by said electrical supply source) or by the absence of a message. The absence of a message indicates to the device that the electrical supply source is for example a mains socket, while receiving a message indicates for example that the electrical supply source is an electronic apparatus, such as a computer.

Depending on the type of electrical supply source, the device is configured to vary the intensities of the current intended to charge the battery of said device.

According to another possible feature, the device comprises a vibrator serving to alert the user of said device when necessary.

FIG. 1 shows a highly schematic view of a device 1 for an electronic pressure checking system 3 for the tyres of a motor vehicle 5 (said device 1 also being able to be designated by the terms "valve activator" or "valve forcer"). The motor vehicle 5 firstly is equipped with tyres 7 wherein sensors 9 are housed, such as pressure sensors, and secondly comprises an onboard computer 11 (also referred to as an electronic control unit and designated generally by the abbreviation ECU).

The device 1 comprises a housing 13, for example made from plastics material, a display device 15, a keypad 17 and an antenna 19 for emitting a sensor activation signal, as well as an OBD socket 21. Said OBD socket 21 is configured to enable for example the device 1 to be connected to the onboard computer 11 of a vehicle, in particular by means of an OBD cable.

More particularly, the housing 13 comprises two opposite main faces 13a that are connected together by four secondary faces 13b opposite in pairs. In addition, said housing 13 has an elongate shape and thus includes two opposite longitudinal ends 14a and 14b.

The display device 15 is disposed on one of the main faces 13a in proximity to one of the longitudinal ends 14a, preferably also in proximity to the antenna 19, while the OBD socket 21 is disposed on one of the secondary faces in proximity to the other longitudinal end 14b of the housing 13.

Figure 2:
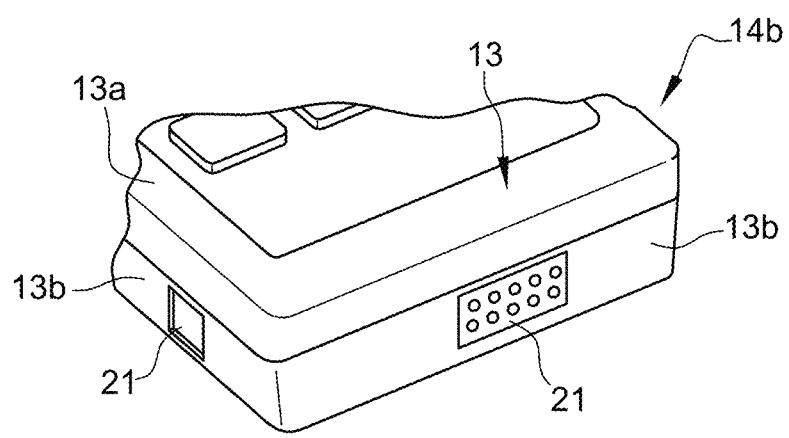
FIG. 2 is an enlarged view of a part of the device of FIG. 1.

The device 1 also comprises a communication port 18, for example disposed on one of the secondary faces 13b (more particularly visible in FIG. 2), preferably in proximity to the longitudinal end 14b opposite to the antenna 19. Said communication port 18 is for example a port of the USB type.

Figure 3:
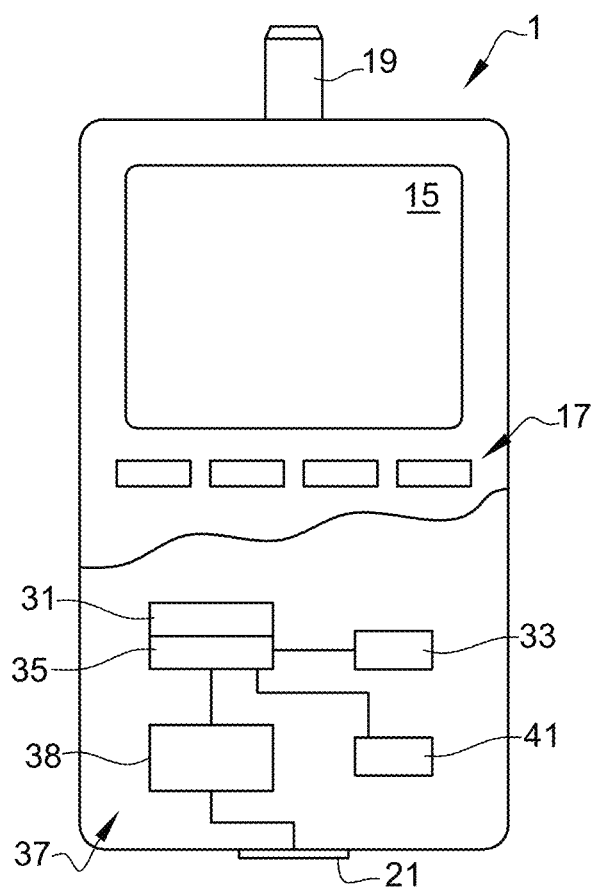
FIG. 3 is a detailed front view of the device of FIG. 1.

FIG. 3 is a highly schematic detail representation of the device 1 of FIG. 1.

Said device 1 thus comprises:

at least one means 31 for activating a tyre sensor, such as means for generating sensor-activation signals (continuous and/or modulated), said activation means 31 comprising the antenna 19 that makes it possible in particular to best propagate said signals generated as far as the sensors 9;

means 33 for receiving signals coming from the sensors, generally another antenna housed in the housing 13 and configured for example for receiving signals with a frequency of 433.92 MHz or 315 MHz (the sensor emitting a signal after having been activated by said activation means 31);

an electronic entity 35 (e.g., processor) configured for storing and/or processing information conveyed by the signals emitted by said sensors 9 (and received by means of the reception means 33);

means 37 for communicating with an onboard computer 11 of a motor vehicle to transmit the information from at least one of said sensors 9, information received by means of signals coming from said sensors 9.

The communication means 37 is for example an OBD module that comprises a circuit 38 for managing the OBD communication and the OBD socket 21 previously mentioned. It should be noted that the management circuit 38 may also be integrated in the electronic entity 35.

It should be noted that activation signals are electromagnetic signals, continuous or modulated, emitted by the activation means 31, which have for example a frequency of 125 kHz.

The device 1 also comprises a battery 41 (preferably a single battery). Said battery 41 being configured for delivering a DC voltage value VB, a value that is substantially fixed and having for example a maximum value of 4.2 V. Thus, said activation means 31 comprises an electrical conversion system 40 configured for transforming the voltage VB received by the battery 41 and delivering it to the antenna 19.

Figure 4:
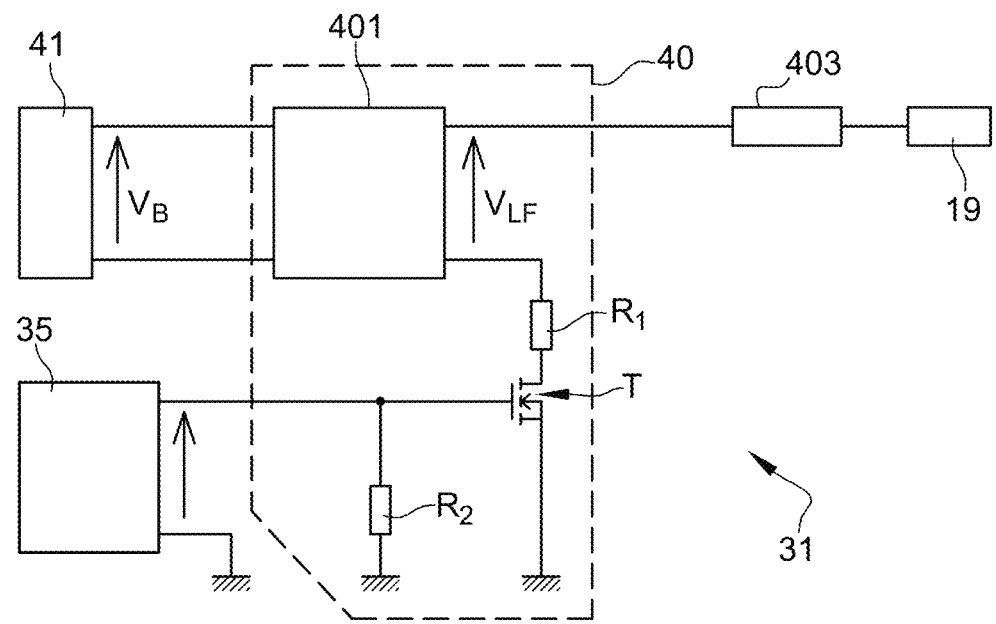
FIG. 4 is a schematic representation of a part of the electronic circuit of the device of FIG. 3.

More particularly, FIG. 4 is a detailed schematic view of said electrical conversion system 40.

Said system 40 thus comprises a module 401 the input of which is connected to the battery 41, the battery 41 supplying the module 401 with the voltage VB, and the output of which is connected to a circuit 403, such as a PWM module, making it possible to modify the amplitude of the signal serving to generate the activation signal, and to a switch T, the switch T being connected to said module 401 by means of a resistance R1. As for the module 401, this is configured for supplying, as an output, a DC voltage denoted VLF.

Thus, said conversion system 40 comprises a circuit converting a first voltage VB into a second voltage VLF.

The PWM module 403 therefore receives as an input a DC voltage VLF and supplies, as an output, to the antenna 19, an electrical signal the voltage of which varies according to the duty cycle selected.

Moreover, the switch T is for example connected to and controlled by the electronic entity 35.

Thus, in the embodiment shown in FIG. 4 et seq, the switch T is a transistor (for example a MOSFET) the gate of which is connected to the electronic entity 35 and which is controlled by the voltage delivered to said transistor T by the electronic entity 35. Moreover, a resistor R2 may be disposed between the entity 35 and the switch T when the latter is a transistor, in order to bias the latter suitably when said device 1 is activated.

Thus, according to the position, open and closed, of the switch T, the value of the voltage VLF at the output of the module 401 can take two different values.

Figure 4A:
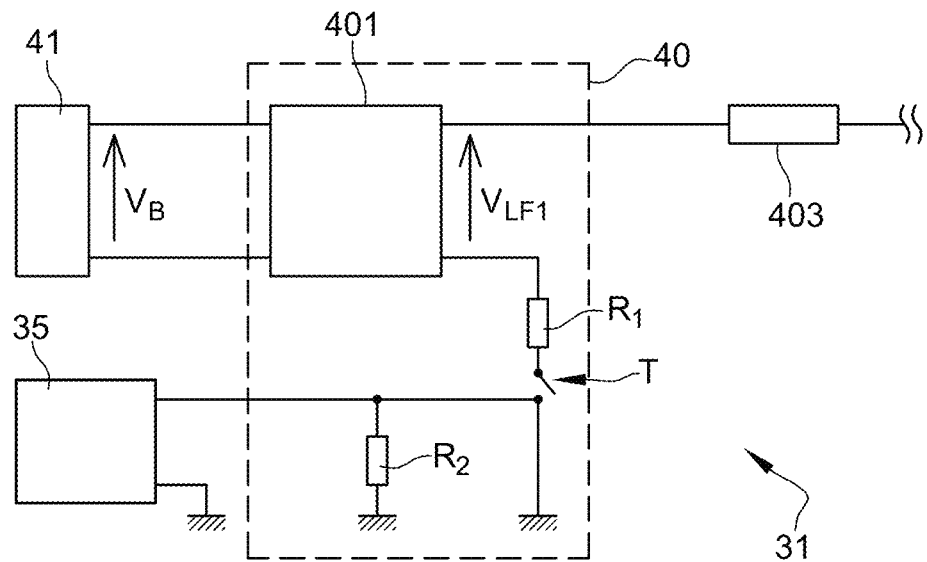
FIG. 4a is a schematic representation of a part of the electronic circuit of the device of FIG. 3.
Figure 4B:
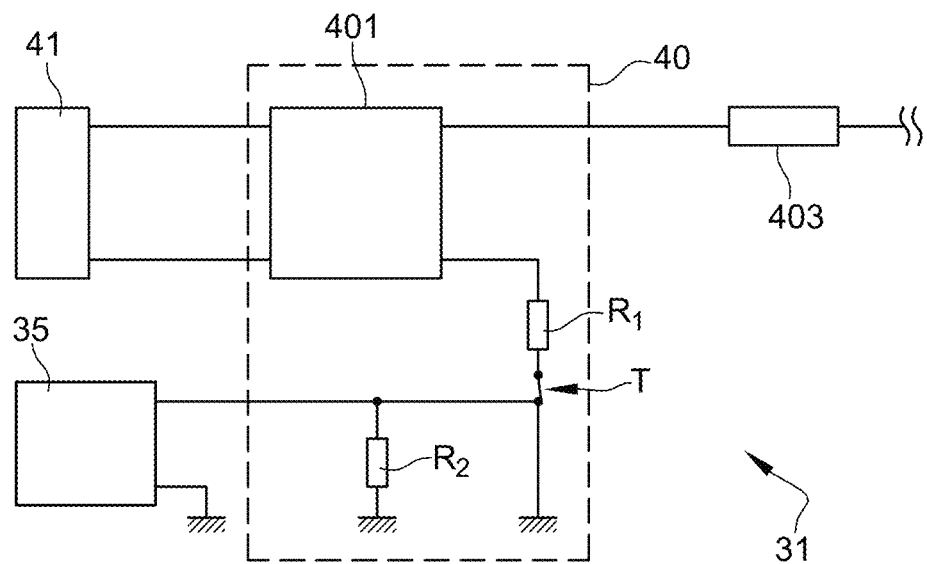
FIG. 4b is a schematic representation of a part of the electronic circuit of the device of FIG. 3.

The positions of the switch T and the consequences thereof are more particularly illustrated in FIGS. 4a and 4b.

Thus, if the switch T is open, as illustrated in FIG. 4a, the resistance R1 is in short-circuit and does not influence the output voltage VLF of the module 401, and the output voltage of the module 401 then takes a first value denoted VLF1, for example a value of 7.2 V.

Thus, if the switch T is closed, as illustrated in FIG. 4b, the resistance R1 influences the output voltage VLF of the module 401, and the output voltage of the module 401 takes a second value denoted VLF2. It should be noted that the first value denoted VLF1 is lower than the second value denoted VLF2, and said second value VLF2 has for example a value of 9.5 V.

The PWM module 403 can therefore be supplied by two different DC voltage values VLF1 and VLF2 thus making it possible to generate a sensor-activation signal (emitted by the antenna 19) and which may have variable powers, while dispensing with having a plurality of voltage sources (DC or not).

For the record, the power of the activation signal emitted by the activation means 31, by means of the antenna 19, is correlated with the voltage value arriving at the antenna 19 and serving to generate an activation signal.

Figure 5:
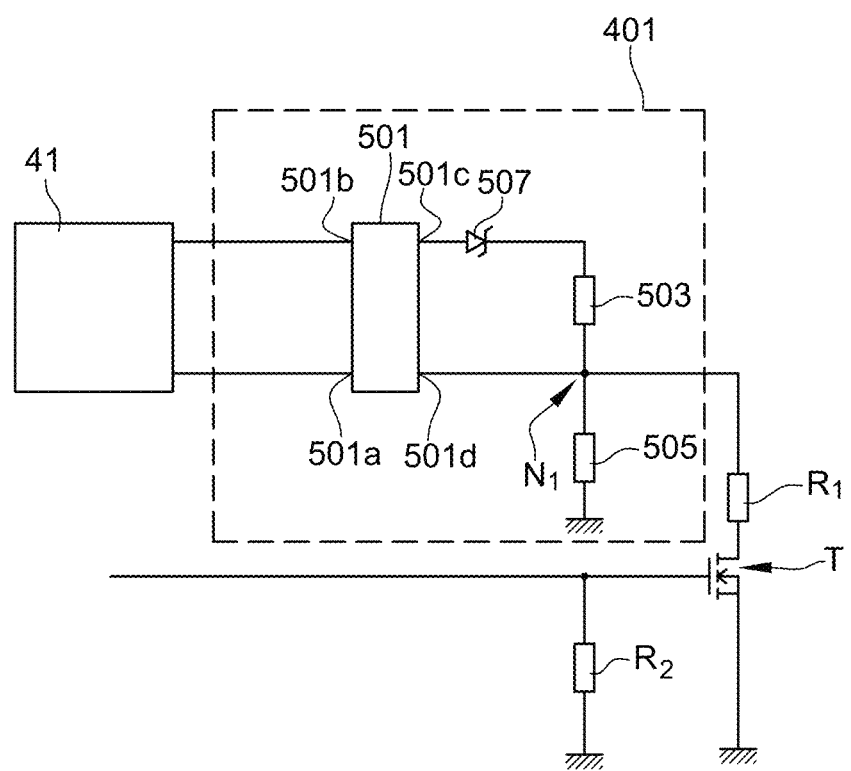
FIG. 5 is a schematic representation of a subpart of the electronic circuit of FIG. 4.

FIG. 5 is a schematic and more detailed view of the module 401. Said module 401 thus comprises a circuit or component 501 supplied by the first voltage VB (coming from the battery 41) and associated with a voltage divider bridge composed of at least a first and a second resistor, respectively 503 and 505.

The circuit or component 501 is connected firstly to the input of the battery 41 and secondly to the output of the first resistor 503 of the divider bridge, said first resistor 503 being disposed in parallel with the output terminals of the circuit or component 501. Said circuit or component 501 furthermore includes two inputs 501a and 501b and two outputs 501c and 501d (respectively the first and second output).

The second resistor 505 is thus connected to earth and to a node N1 connecting the first output 501c of the circuit or component 501 by means of the first resistor 503, the second output 501d of the component or circuit 501, and the resistance R1 previously detailed (the resistance of the conversion system 40). The resistance R1 and the second resistor 505 are disposed in parallel with each other.

With regard to the circuit or component 501, this is configured to increase the voltage VB received coming from the battery 41 and may for example comprise an output 501c (in particular when it is a dedicated component) that enables the component 501 to regulate the voltage VLF delivered as an output.

The module 401 may also comprise a diode 507, for example Schottky, disposed between the first output 501c and the first resistance R1, which fulfils the role of a freewheeling diode.

Moreover, the communication port 18 is configured for receiving an electrical energy intended to charge said battery 41. Said communication port 18 is therefore intended (in addition to being configured for communicating with an electronic apparatus, such as a computer) to be connected to an electrical supply source for recharging said battery 41.

Said electrical supply source may be a mains socket, but also any type of electronic or electrical apparatus capable of electrically supplying the battery 41, such as a computer.

The electronic entity 35 of the device 1 is moreover configured for detecting the type of electrical supply source connected to said device 1 by means of the communication port 18.

The electronic entity 35 is configured for receiving, by means of said communication port 18, a message or signal coming from an electronic apparatus connected to said device 1. Thus, when the electronic entity 35 receives a message, the entity 35 then limits the intensity of the current intended to charge the battery 41 to a first value I1, said first value I1 being for example at a maximum equal to 500 mA.

Should the electronic entity 35 not receive a signal or message, the entity 35 adjusts the intensity of the current intended to charge the battery 41 to a second value I2, said second value I2 being higher than the first value I1. Said second value I2 is for example between 1 and 2 A.

Preferentially, the electronic entity 35 is configured so that the charging of the battery 41 takes place first of all with the first intensity value I1, if no message is received by the entity 35 during a time t, for example 30 seconds, then the intensity of the current charging the battery 41 takes the second intensity value I2.

The reception or not of a signal coming from the electrical supply source therefore makes it possible to detect the type of electrical source connected to the device 1 and to adapt the intensity of the current charging the battery 41 accordingly, in order to avoid damaging the electrical supply source.

The invention claimed is:

1. A device for an electronic system for checking pressure of tyres of a motor vehicle, the device comprising:
    means for activating tyre sensors;
    means for receiving signals coming from the sensors;
    an electronic entity configured for storing and/or processing information conveyed by the signals emitted by the sensors;
    means for communicating with a motor vehicle onboard computer for transmitting the information from at least one of the sensors; and
    the activation means comprising an electrical conversion system; the electrical conversion system being configured for converting a first voltage of a battery into a second direct current voltage; wherein the electrical conversion system is configured for selectively delivering two distinct values of the second direct current voltage.

2. The device of claim 1; characterized in that the electrical conversion system is configured to input the second direct current voltage to a pulse width modulation module to generate a modulated activation signal with a power level correlated with a value of the second direct current voltage.

3. The device of claim 1; characterized in that the electrical conversion system comprises a module that is supplied by the first voltage and is associated with at least one switch; the module delivering a first voltage value if the switch is open and a second voltage value if the switch is closed.

4. The device of claim 3; characterized in that the module comprises a voltage-increase circuit or component as well as a voltage divider bridge.

5. The device of claim 1; characterized in that the communication means is an OBD module that is housed in the device and is configured for being connected to the onboard computer.

6. The device of claim 1, characterized in that the communication means comprises an OBD socket.

7. The device of claim 6, characterized in that the device comprises a display device.

8. The device of claim 7, characterized in that the device comprises a housing wherein the display device and the OED socket are housed, the OED socket and the display device being disposed at opposite ends, of the housing.

9. The device of claim 1, characterized in that the device comprises a communication port, the communication port being configured for being connected to an electrical supply source in order to recharge the battery.

10. The device of claim 9, characterized in that the electronic entity is configured for detecting a type of electrical supply source that is connected to the device by means of the communication port.

11. The device of claim 10, characterized in that the electronic entity detects the type of electrical source by means of a message sent by an electronic apparatus and/or by an absence of a message.

12. The device of claim 1, characterized in that it comprises a circuit for varying amplitude of a signal arriving an antenna and which serves to generate signal activating the sensors.

13. A device for an electronic system for checking pressure of tyres of a motor vehicle, the device comprising:
    a first antenna configured to transmit an activation signal for activating tyre sensors,
    a second antenna configured to receive signals coming from the sensors,
    a processor configured for storing and/or processing information conveyed by the signals emitted by the sensors;
    an OBD socket connected to the processor and configured for communicating with a motor vehicle onboard computer for transmitting the information from at least one of the sensors; and
    an electrical conversion system connected to the first antenna, the electrical conversion system being configured for converting a first voltage of a battery into a second direct current voltage, wherein the electrical conversion system is configured for selectively delivering two distinct values of the second direct current voltage.

14. The device of claim 13, characterized in that the electrical conversion system is configured to input the second direct current voltage to a pulse width modulation module to generate the activation signal with a power level correlated with a value of the second direct current voltage.

15. The device of claim 14, characterized in that the electrical conversion system comprises a module that is supplied by the first voltage and is associated with at least one switch, the module delivering a first voltage value if the switch is open and a second voltage value if the switch is closed.

16. The device of claim 15, characterized in that the module comprises a voltage-increase circuit or component as well as a voltage divider bridge.

17. The device of claim 13, characterized in that the device comprises a display device and a housing wherein the display device and the OED socket are housed, the OED socket and the display device being disposed at opposite ends of the housing.

18. The device of claim 13, characterized in that the device comprises a communication port, the communication port being configured for being connected to an electrical supply source in order to recharge the battery.

19. The device of claim 18, characterized in that the processor is configured for detecting a type of electrical supply source that is connected to the device by means of the communication port.

20. The device of claim 13, characterized in that the device comprises a circuit for varying amplitude of a signal arriving at the first antenna and which serves to generate the activation signal for activating the sensors.

* * * * *